United States Patent [19]
Roberts

[11] Patent Number: 6,101,075
[45] Date of Patent: Aug. 8, 2000

[54] SYSTEM FOR IMPROVING PROTECTIVE RELAY COORDINATION WITH OTHER PROTECTIVE ELEMENTS IN POWER SYSTEM

[75] Inventor: Jeffrey B. Roberts, Pullman, Wash.

[73] Assignee: Schweitzer Engineering Laboratories, Inc., Pullman, Wash.

[21] Appl. No.: 09/150,556

[22] Filed: Sep. 10, 1998

[51] Int. Cl.[7] ...................................................... H02H 3/00
[52] U.S. Cl. ................................ 361/85; 361/62; 361/115
[58] Field of Search .................................. 361/85, 66, 64, 361/62, 115, 58, 42

[56] References Cited

U.S. PATENT DOCUMENTS

| | | | |
|---|---|---|---|
| 4,896,241 | 1/1990 | Li et al. | 361/66 |
| 5,402,071 | 3/1995 | Bastard et al. | 324/509 |

*Primary Examiner*—Stephen W. Jackson
*Attorney, Agent, or Firm*—Jensen & Puntigam, P.S.

[57] ABSTRACT

The system first identifies the existence of a fault involving ground using the phase angle difference between negative sequence and zero sequence current on the power line. Phase angle differences within three specific ranges provide an indication of the presence of particular faults. Once a particular fault has been identified, such as a BC-to-ground fault, the fault condition is monitored to determine if the fault evolves, such as to a C-to-ground fault from the BC-to-ground fault. If an evolution is recognized, the protective relay is reset so as to coordinate its operation with downstream protective elements for the evolved fault.

6 Claims, 3 Drawing Sheets

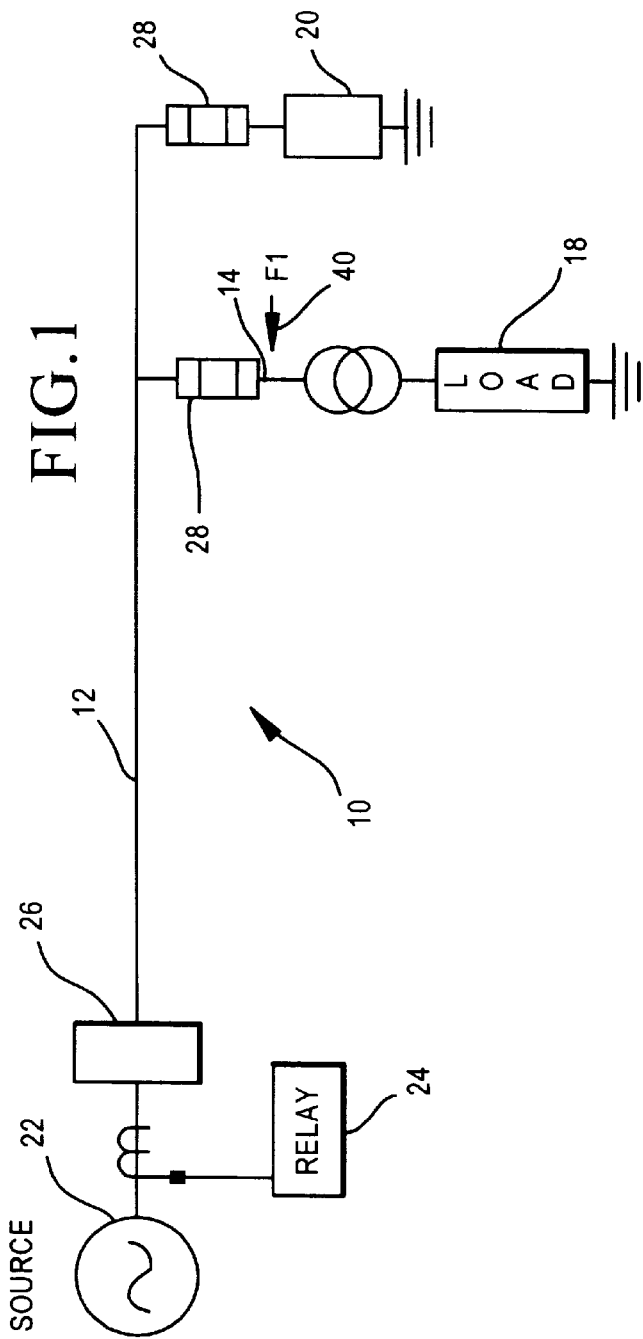

SYSTEM FOR IMPROVING PROTECTIVE RELAY COORDINATION WITH OTHER PROTECTIVE ELEMENTS IN POWER SYSTEM

TECHNICAL FIELD

This invention relates generally to operational coordination between a protective relay on a power line, such as a distribution line, and downstream protective elements, and more particularly concerns such a system in which the downstream protective element is a fuse or similar device located on a lateral line off of the distribution main line.

BACKGROUND OF THE INVENTION

FIG. 1 shows a single-line distribution feeder 10, comprising a distribution main line 12 and two lateral lines 14 and 16 operating into loads 18 and 20. There may of course be additional lateral lines and their loads off of main line 12. Distribution feeder 10 is fed by a source 22, with main line 12 being protected by a relay 24 and a circuit breaker 26. The lateral lines are typically protected by fuses 28. Fuses 28 are a popular choice for protection of lateral lines for many utilities because of their relatively low cost, although they do have to be replaced following operation.

Relay 24 will trip breaker 26 in response to all main line faults, thereby interrupting power to all the main line and lateral loads, but also serves as backup protection for faults on the various lateral circuits. Typical operational coordination between relay 24 and the fuses on the various lateral lines requires that the relay time-to-trip be longer than the time-to-trip characteristic of the power fuses on the lateral lines. Although this in itself is a compromise on the part of the relay operation which results in some voltage "sag" in the area surrounding the faulted feeder when there is a fault on a lateral, it is typically an acceptable compromise to the utility and its customers.

However, in the case where the fault evolves from a phase-to-phase to ground fault to a phase-to-ground fault, the coordination with the relay becomes more complex and difficult. It is preferable, of course, that faults on individual lateral lines be cleared by the fuse(s) present on that lateral. This means that the fuse should operate before the relay does. It is also important, however, that main line faults be recognized and cleared as promptly as possible. When a fault evolves, the relay "times" toward a trip from the beginning of the fault. Setting the trip time longer so as to accommodate a fuse operating to protect one phase in an evolving fault will severely compromise the main line clearing function of the relay.

In particular, such an increase in the relay trip time will result in main line faults persisting longer than they otherwise need to, resulting in a voltage sag to the surrounding distribution lines for a greater time than necessary, which is undesirable. The alternative to date to increasing the relay trip time, however, is to allow the main line relay to time from the first indication of a fault and then trip the main line breaker before the protective element (the fuse) for the second part of the evolving fault operates, which results in a power outage to all the customers on the main line for a time instead of just for those customers on the lateral on which the fault occurs.

Hence, there is at present a mis-coordination problem for evolving faults between a protective relay and downstream protective elements, resulting in undesirable consequences for the power system customers, regardless of whether the relay time is increased to permit the downstream elements, such as a fuse, to operate to clear the evolving fault or to maintain the relay trip time at a value where it operates before the downstream element.

DISCLOSURE OF THE INVENTION

Accordingly, the present invention is a system for coordinating operation of a protective relay on a power line which includes laterals, with downstream protective elements, comprising: means for determining an initial fault type which involves ground on the power line which has the possibility of evolving into a different fault type involving ground; means for recognizing the evolution of said initial fault type into a different fault type; and means for resetting the operation of the protective relay upon recognition of the evolution of the initial fault type into the different fault type.

BRIEF DESCRIPTION OF THE DRAWINGS

FIG. 1 is a simplified schematic diagram showing a distribution feeder line which includes a distribution main line with several lateral lines protected by fuses.

FIG. 2 is a table showing current values for an evolving fault.

BEST MODE FOR CARRYING OUT THE INVENTION

Referring to FIG. 1 again, a particular evolving fault will be described in the context of the distribution feeder arrangement shown therein, both for an existing coordination approach and with the system of the present invention, which results in significantly improved coordination.

FIG. 1 shows a fault F1 on lateral line 14 at 40. The particular fault begins as a phase B to phase C to ground (BCG) fault. It should be understood, however, that the BCG fault designation is for illustration; several other initial fault conditions capable of evolving into other fault types are covered by the present system. In the illustration shown for a BCG fault, the B-phase fault current is assumed to be considerably higher than the C-phase fault current, because the B-phase load current adds with the B-phase fault current. While both the B and C-phase fuses will eventually operate to clear the fault (unless a backup protective element intervenes), the B-phase fuse will operate first in the specific example provided in FIG. 2. The C-phase fuse will not operate simultaneously, because in the example, the B-phase fuse carries considerably more current.

One standard operating time fuse will operate in 0.475 seconds at 422 amps primary (FIG. 2). The C-phase current is not sufficient at that point to melt the C-phase fuse. To clear the entire fault (the remaining phase contributing to the fault), however, the C-phase fuse will in fact operate at some near point in the future. The relay 24 on the main line, however, has been timing since the start of the fault. The relay 24 includes a ground time overcurrent element therein which has an extremely inverse characteristic, to achieve optimum coordination across a broad range of fault currents. A typical relay time setting will be 5.24 seconds. With a B-phase fuse time of 0.457 seconds, the relay has a head start of that amount of time (the B-phase fuse time) on the C-phase fuse. The operate time for the relay is 1.29 seconds for the C-phase to ground current values of FIG. 2, while the interrupt time for the C-phase fuse is 1.4 seconds. The result is a mis-coordination of 0.11 seconds. This means that relay 24 will trip breaker 26 before the C-phase fuse would otherwise complete the interruption of the fault current, resulting in interruption of power to the entire main line 12 unnecessarily.

Figure 3:
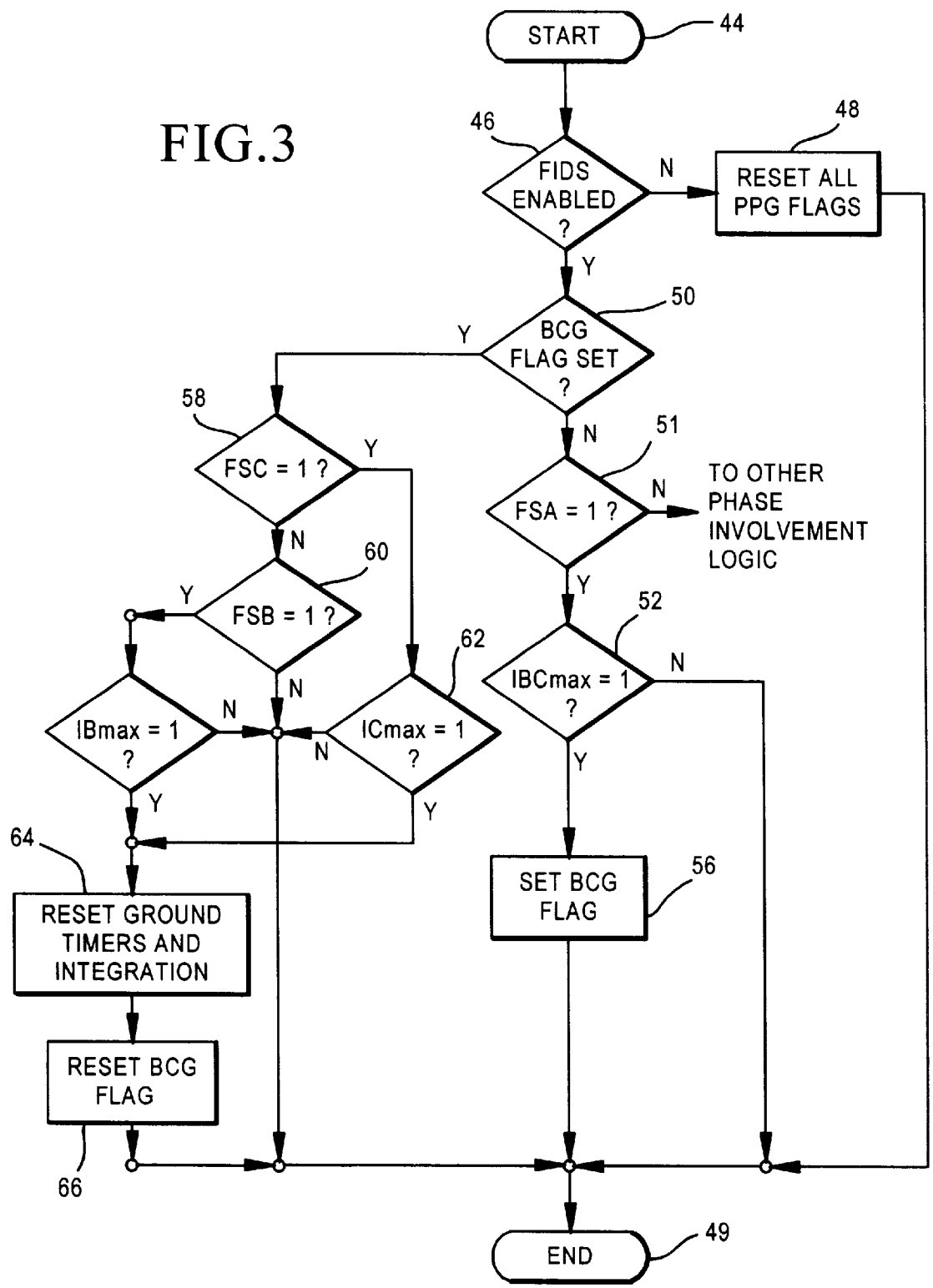
FIG. 3 is a logic diagram showing the present invention for one particular type of fault evolution.
Figure 4:
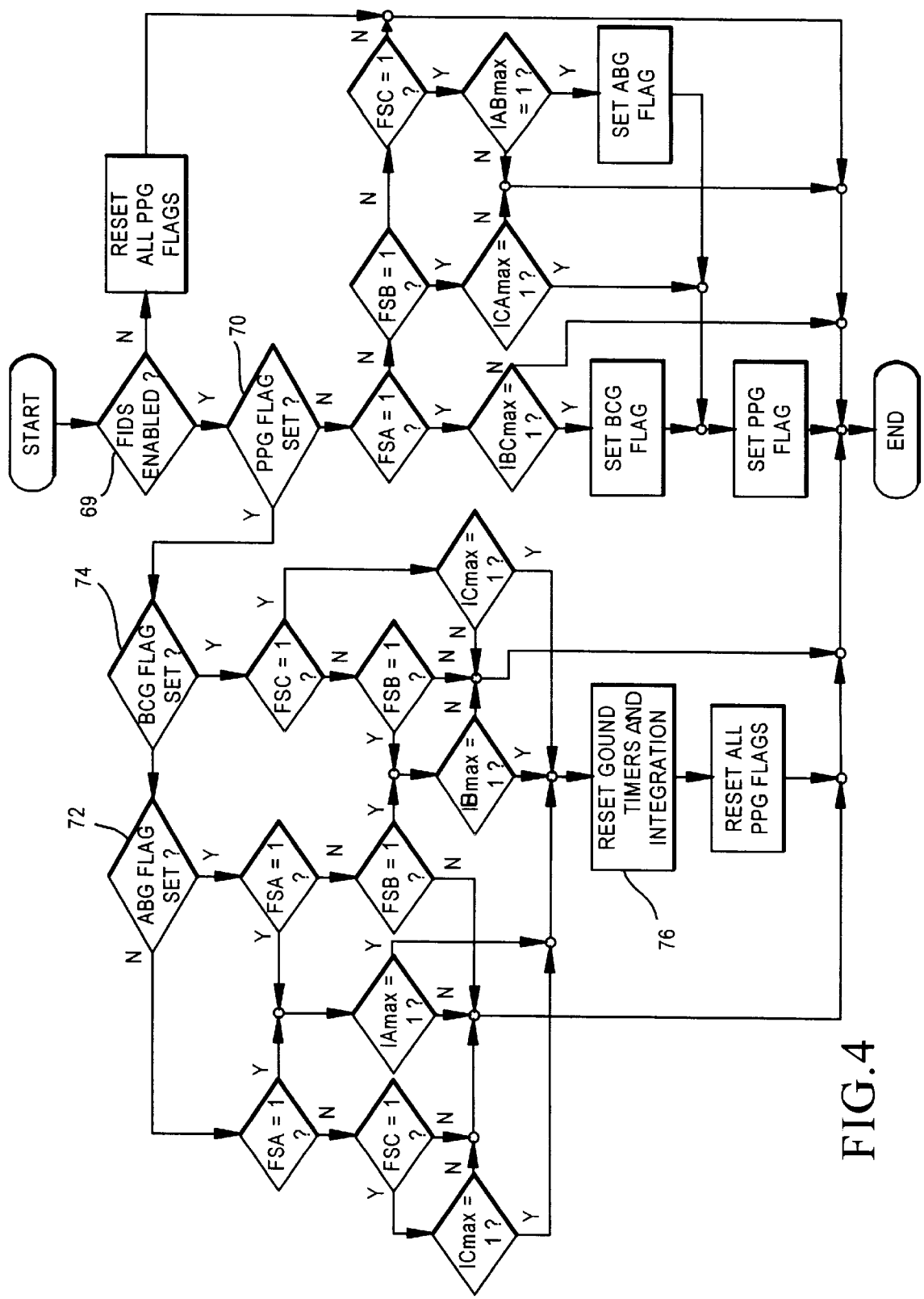
FIG. 4 is a logic diagram showing the present invention for all the fault conditions covered by the present invention.

The software of the present invention, shown in FIGS. 3 and 4, makes a determination, based on various power line signals, to reset the time overcurrent relay during an evolving fault (after an evolving fault has been recognized), so that it begins to time again as the fault evolves, instead of continuing to time from the onset of the fault. This results in the fuse (downstream element) operating to clear the fault.

FIG. 3 shows the operation of the software when there is an initial BC-to-ground fault. FIG. 4, on the other hand, shows the entire software, specifically the operation of the present invention for other fault conditions. FIG. 3 basically is a part of FIG. 4. Initial identification of a particular type of fault is made by circuitry which is disclosed in U.S. Pat. No. 5,515,227 entitled "Fault Identification System for Use in Protective Relays for Power Transmission Lines", or similar circuitry. The present invention utilizes the initial determination of fault type by that particular circuit as the input to the circuit of FIGS. 3 and 4. The contents of the '227 patent are hereby incorporated by reference. The identification system of the '227 patent is referred to in FIGS. 3 and 4 as "FIDS", for fault identification system. In the present invention, the information provided by the '227 FIDS system is combined with maximum phase and phase-to-phase current information to identify fault evolution.

The computer software illustrated in FIG. 3 will cycle approximately four times per power system cycle in the embodiment shown. Other cycle times can be used. The start of a cycle is shown at block 44. At 46, a determination is made whether or not the FIDS circuitry is enabled. The FIDS circuitry is enabled in accordance with the teaching of the '227 patent when a fault involving ground is initially recognized, such as by the presence of ground current. If no fault involving ground is recognized, all of the PPG (phase-phase-ground) flags are reset, as shown at block 48. The program then moves to the end of that cycle (block 49) and then begins its next cycle at the next selected time.

If the FIDS circuitry is enabled, on the other hand, meaning a fault involving ground has been detected, a determination is made as to whether a particular initial fault, such as a BC-to-ground fault, has already been determined and the appropriate flag set. This is shown at 50. The setting of the BCG fault flag is made by block 56 in FIG. 3. The flag is zero (not set) for the pass (cycle) through the logic shown in FIG. 3 following enabling of the FIDS circuit.

The determination of the initial fault information (and the setting of the correct flag) is made by comparing the phase angle between the negative sequence current and the zero sequence current on the power line. If the phase angle difference is 0° ±60°, the fault type is either A-to-ground or BC-to-ground and the "FSA" output signal line from the FIDS circuit is one (high). If the phase angle difference between the negative sequence current and the zero sequence current is 120° ±60°, the fault will be either B-to-ground or AB-to-ground. In this case, the "FSB" output signal line is one. Third, if the difference angle is −120° ±60°, the "FSC" output signal line is one. The designations FSA, FSB and FSC are arbitrary designations, each standing for a particular phase angle difference range, each range in turn associated with two particular faults. Other designations can be used.

Referring still to FIG. 3, with the example of a BC-ground fault, an FSA signal is produced by the FIDS circuit. This is shown at block 51. A "yes" answer from block 51 will then result in a determination, at block 52, as to whether the BC-phase current is the maximum of all the phase-to-phase currents. If not, the process cycle goes to the end and repeats. If the output of block 52 is no, the fault type is A-phase-to-ground.

If the BC-phase current is the maximum phase-to-phase current, however, the BC flag is set, at block 56. The setting of the BC-to-ground flag is an indication that a BC-ground fault has occurred. The program goes to the end and then begins a new process cycle, with the BCG flag set. In the next cycle, the program will take the "yes" branch from block 50 to see if the output from the FIDS circuit has changed to an FSC signal, at block 58, or an FSB signal, at block 60. If neither the FSC nor the FSB flag has been set, indicating that the fault has not evolved from FSA (the original BC-ground fault), then the program goes to the end and another process cycle begins. However, if either the FSC or the FSB flag is set, then the fault has in fact evolved. If the fault evolves (changes), then the FIDS signal also changes, such as to FSC from FSA, as a fault evolves from a BC-to-ground fault to a C-phase to ground fault, in accordance with the example. If the FIDS determination is FSC, such as shown in block 58, then a determination is made, in block 62, whether or not the C-phase current is maximum relative to the other phase currents. If not, then the program moves to the end and another process cycle begins. If the C-phase current is maximum, then the relay element, specifically the ground current timers and the integration function of the ground overcurrent element, are reset, at block 64. The ground overcurrent protective functions have been timing since the initial recognition of the BC-ground fault. They now begin timing again, approximately coincident (within ¼ power cycle) with the evolution of the fault from a BC-ground fault to a C-phase to ground fault. Next, the original BCG flag is reset, at block 66.

FIG. 3 and the above explanation was for the specific example of a BC-ground fault, which evolved into a C-ground fault.

FIG. 4 shows a more complete version of FIG. 3, which covers all three possible initial phase-to-phase faults, specifically BCG (B-to-C-to-ground), ABG (A-to-B-to-ground) and CAG (C-to-A-to-ground). In FIG. 4, after it has been determined that the FIDS circuit is enabled (block 69) by a determination of detection of current involving ground in one cycle, the decision at block 70 will be general, i.e. whether any of the three phase-to-phase-to-ground flags have been set. The first pass will result in either a BCG flag (block 72), an ABG flag (block 74) or a CAG flag being set, depending on the FIDS determination. In the next and subsequent cycles, the program will continue to assess whether or not the fault has evolved and if so, to reset the relay element (block 76), as described below. As shown in FIG. 4, an initial BC-ground fault could evolve into a B or C-to-ground fault; an initial AB-ground fault could evolve into an A or B-to-ground fault, while a CA-ground fault (there is no CAG flag per se; it is a default condition) could evolve into a C or A-to-ground fault. The operation of FIG. 4, which is self-explanatory relative to the explanation of FIG. 3, covers most of the possibilities of evolving line faults.

Accordingly, a system has been described which makes an initial determination of fault type, and then monitors the possible evolution of the initial fault to a different fault type. If a fault evolution is detected, the main line backup relay is reset so that it times with, instead of ahead of, the protective elements in the evolved fault.

A preferred embodiment of the above-identified invention has been disclosed. However, it should be understood that various changes, modifications and substitutions may be made in such preferred embodiment without departing from the spirit of the invention, which is defined by the claims which follow.

What is claimed is:

1. A system for coordinating operation of a protective relay on a power distribution line which includes laterals, with downstream protective elements, comprising:

means for determining an initial fault type involving ground on the power line which has the possibility of evolving into a different fault type involving ground, including a timing-type element associated with the protective relay for initiating a tripping operation by the protective relay following a selected period of time after said initial fault type has been determined;

means for recognizing the evolution of said initial fault type into a different fault type; and means for resetting said timing-type element, thereby preventing a tripping operation by the protective relay during an additional period of time upon recognition of the evolution of the initial fault type into the different fault type.

2. A system of claim 1, wherein the initial fault types are B-phase to C-phase to ground fault, A-phase to B-phase to ground, and C-phase to A-phase to ground.

3. A system of claim 1, wherein the means for determining an initial fault type includes means for determining the phase angle between negative sequence current and zero sequence current on the power line, wherein a phase angle difference within a first range indicates an A-phase to ground fault or a B-phase to C-phase to ground fault, wherein a phase angle difference within a second range indicates a B-phase to ground fault or an A-phase to B-phase to ground fault, and wherein a phase angle difference within a third range indicates a C-phase to ground fault or a C-phase to A-phase to ground fault.

4. A system of claim 3, wherein the first range of phase angles is 0° ±60°, a second range of phase angles is 120° ±60°, and a third range of phase angles is −120° ±60°.

5. A system of claim 3, wherein the means for recognizing the evolution of the initial fault includes means for determining a change of said phase angle difference from one range to another range.

6. A system of claim 5, wherein the means for recognizing the evolution of the initial fault includes means for determining whether phase-to-phase current for said different fault type is maximum relative to other fault type phase-to-phase currents.

* * * * *